United States Patent
Massand

(10) Patent No.: US 7,895,276 B2
(45) Date of Patent: Feb. 22, 2011

(54) METHOD OF MANAGING METADATA IN ATTACHMENTS TO E-MAILS IN A NETWORK ENVIRONMENT

(75) Inventor: Deepak Massand, McLeansville, NC (US)

(73) Assignee: Litera Technology LLC, McLeansville, NC (US)

( * ) Notice: Subject to any disclaimer, the term of this patent is extended or adjusted under 35 U.S.C. 154(b) by 314 days.

(21) Appl. No.: 11/699,750

(22) Filed: Jan. 29, 2007

(65) Prior Publication Data

US 2008/0256188 A1    Oct. 16, 2008

(51) Int. Cl.
*G06F 15/16*    (2006.01)
(52) U.S. Cl. ...................... 709/206; 709/204
(58) Field of Classification Search ......... 709/204–207; 707/694–695, 203; 715/229–231
See application file for complete search history.

(56) References Cited

U.S. PATENT DOCUMENTS

| | | | |
|---|---|---|---|
| 3,920,895 A | 11/1975 | Vieri et al. | |
| 3,920,896 A | 11/1975 | Bishop et al. | |
| 5,008,853 A | 4/1991 | Bly et al. | |
| 5,129,082 A | 7/1992 | Tirfing et al. | |
| 5,146,552 A | 9/1992 | Cassorla et al. | |
| 5,204,947 A | 4/1993 | Bernstein et al. | |
| 5,321,505 A | 6/1994 | Leddy | |
| 5,341,469 A | 8/1994 | Rossberg et al. | |
| 5,515,491 A | 5/1996 | Bates et al. | |
| 5,539,871 A | 7/1996 | Gibson | |
| 5,596,700 A | 1/1997 | Darnell et al. | |
| 5,596,705 A | 1/1997 | Reimer et al. | |
| 5,659,676 A | 8/1997 | Redpath | |
| 5,664,208 A | 9/1997 | Pavley et al. | |
| 5,669,005 A | 9/1997 | Curbow et al. | |
| 5,671,428 A | 9/1997 | Muranaga et al. | |
| 5,694,544 A | 12/1997 | Tanigawa et al. | |
| 5,706,452 A | 1/1998 | Ivanov | |
| 5,706,502 A | 1/1998 | Foley et al. | |
| 5,708,826 A | 1/1998 | Ikeda et al. | |
| 5,708,845 A | 1/1998 | Wistendahl et al. | |
| 5,740,444 A | 4/1998 | Frid-Nielsen | |
| 5,752,055 A | 5/1998 | Redpath et al. | |
| 5,758,313 A | 5/1998 | Shah et al. | |
| 5,761,419 A | 6/1998 | Schwartz et al. | |
| 5,761,499 A | 6/1998 | Sonderegger | |
| 5,781,732 A | 7/1998 | Adams | |
| 5,781,901 A * | 7/1998 | Kuzma | 709/206 |
| 5,787,175 A | 7/1998 | Carter | |

(Continued)

OTHER PUBLICATIONS

Deepak Massand, Method of compound document comparison, U.S. Appl. No. 11/444,140, filed May 30, 2006.

(Continued)

*Primary Examiner*—Bharat N Barot
(74) *Attorney, Agent, or Firm*—Finnegan, Henderson, Farabow, Garrett & Dunner, LLP

(57) ABSTRACT

A method and system for removing metadata from email attachments sent from mobile devices includes receiving an email with an attached document. The attached document has metadata removed to create a cleansed version of the attached document. The attached document is replaced by the cleansed version of the attached document, and the email is sent according to the address or addresses included in the email.

21 Claims, 4 Drawing Sheets

U.S. PATENT DOCUMENTS

| | | | |
|---|---|---|---|
| 5,799,191 A | 8/1998 | Moriyasu et al. | |
| 5,801,702 A | 9/1998 | Dolan et al. | |
| 5,809,512 A | 9/1998 | Kato | |
| 5,860,073 A | 1/1999 | Ferrel et al. | |
| 5,864,870 A | 1/1999 | Guck | |
| 5,870,754 A | 2/1999 | Dimitrova et al. | |
| 5,878,421 A | 3/1999 | Ferrel et al. | |
| 5,890,177 A | 3/1999 | Moody et al. | |
| 5,893,126 A | 4/1999 | Drews et al. | |
| 5,911,776 A | 6/1999 | Guck | |
| 5,931,906 A | 8/1999 | Fidelibus, Jr. et al. | |
| 5,937,066 A | 8/1999 | Gennaro et al. | |
| 5,938,724 A | 8/1999 | Pommier et al. | |
| 5,944,785 A | 8/1999 | Pommier et al. | |
| 5,949,413 A | 9/1999 | Lerissa et al. | |
| 5,950,214 A | 9/1999 | Rivette et al. | |
| 5,956,736 A | 9/1999 | Hanson et al. | |
| 5,958,006 A | 9/1999 | Eggleston et al. | |
| 5,978,836 A | 11/1999 | Ouchi | |
| 5,987,469 A | 11/1999 | Lewis et al. | |
| 6,009,462 A * | 12/1999 | Birrell et al. | 709/206 |
| 6,014,135 A | 1/2000 | Fernandes | |
| 6,029,171 A | 2/2000 | Smiga et al. | |
| 6,064,751 A | 5/2000 | Smithies et al. | |
| 6,067,551 A | 5/2000 | Brown et al. | |
| 6,088,709 A | 7/2000 | Watanabe | |
| 6,119,147 A | 9/2000 | Tommey et al. | |
| 6,158,903 A | 12/2000 | Schaeffer et al. | |
| 6,178,431 B1 | 1/2001 | Douglas | |
| 6,182,080 B1 | 1/2001 | Clements | |
| 6,212,534 B1 | 4/2001 | Lo et al. | |
| 6,243,722 B1 | 6/2001 | Day et al. | |
| 6,289,460 B1 | 9/2001 | Hajmiragha | |
| 6,317,777 B1 | 11/2001 | Skarbo et al. | |
| 6,334,141 B1 | 12/2001 | Varma et al. | |
| 6,336,134 B1 | 1/2002 | Varma | |
| 6,343,313 B1 | 1/2002 | Salesky et al. | |
| 6,360,236 B1 | 3/2002 | Khan et al. | |
| 6,363,352 B1 | 3/2002 | Dailey et al. | |
| 6,411,989 B1 | 6/2002 | Anupam et al. | |
| 6,560,637 B1 | 5/2003 | Dunlap et al. | |
| 6,590,584 B1 | 7/2003 | Yamaura et al. | |
| 6,643,663 B1 | 11/2003 | Dabney et al. | |
| 6,681,371 B1 | 1/2004 | Devanbu | |
| 6,687,878 B1 | 2/2004 | Eintracht et al. | |
| 6,708,172 B1 | 3/2004 | Wong et al. | |
| 7,251,680 B2 * | 7/2007 | DeVos | 709/206 |
| 7,424,513 B2 * | 9/2008 | Winjum et al. | 709/206 |
| 2001/0037367 A1 | 11/2001 | Iyer | |
| 2002/0049786 A1 | 4/2002 | Bibliowicz et al. | |
| 2002/0059342 A1 | 5/2002 | Gupta et al. | |
| 2002/0059343 A1 | 5/2002 | Kurishima et al. | |
| 2002/0065848 A1 | 5/2002 | Walker et al. | |
| 2002/0078088 A1 | 6/2002 | Kuruoglu et al. | |
| 2002/0085030 A1 | 7/2002 | Ghani | |
| 2002/0107886 A1 | 8/2002 | Gentner et al. | |
| 2002/0143691 A1 | 10/2002 | Ramaley et al. | |
| 2003/0112273 A1 | 6/2003 | Hadfield et al. | |
| 2003/0158855 A1 | 8/2003 | Farnham et al. | |
| 2003/0197730 A1 | 10/2003 | Kakuta et al. | |
| 2004/0085354 A1 | 5/2004 | Massand | |
| 2004/0205653 A1 | 10/2004 | Hadfield et al. | |
| 2005/0060375 A1 * | 3/2005 | Ernest et al. | 709/206 |
| 2006/0069733 A1 * | 3/2006 | Antonoff et al. | 709/206 |
| 2006/0089931 A1 * | 4/2006 | Giacobbe et al. | 707/9 |
| 2006/0167879 A1 | 7/2006 | Umeki et al. | |
| 2006/0253482 A1 | 11/2006 | Zellweger et al. | |
| 2007/0016613 A1 * | 1/2007 | Foresti et al. | 707/104.1 |
| 2007/0186157 A1 | 8/2007 | Walker et al. | |
| 2008/0183824 A1 * | 7/2008 | Chen et al. | 709/206 |

OTHER PUBLICATIONS

U.S. Appl. No. 12/350,144, filed Jan. 7, 2009.
U.S. Appl. No. 12/406,093, filed Mar. 17, 2009.

* cited by examiner

METHOD OF MANAGING METADATA IN ATTACHMENTS TO E-MAILS IN A NETWORK ENVIRONMENT

BACKGROUND

1. Field of the Invention

The field of the invention relates generally to systems and methods of providing security for data. More particularly, the preferred embodiment relates to electronic cleaning metadata from email attachments, which may be sent from webmail on Exchange or PDA, handheld or mobile devices such as Blackberry, Treo etc.

2. Related Background

Electronic documents often include metadata relating to changes or prior versions of the document which may not be readily apparent to a person viewing the document in an application. For example, a Word document may include history information which is not displayed to a person viewing the document using Word on a PC (or may not be displayed in all views of a document). This is true for other types of electronic documents, including PDFs, Excel Spreadsheets, etc. Additionally, electronic documents may include additional metadata concerning the document, such as when the document was created, who created the document, etc. While many users may not be concerned with such information, such information may include sensitive or proprietary information that a user, or others, may not wish to share when the electronic document is shared. For example, a user emailing an electronic document may wish not to share some information relating to the history or creation of the document (or the user's employer may wish the user did not share such information outside the company).

The problem of document metadata is made more complicated by the use of smart phones, PDAs, and other mobile devices which may be used to send email, including email with attachments.

Conventional email and document editing and creation systems allow users to share electronic documents, but also allow users to share documents with sensitive metadata. Many desktop based Metadata removal products exist today including Metadata Sweeper by Litera Corp®, Out of Sight by SoftWise™, Protect by Workshare™, Metadata Assistant by Payne Consulting™ and iScrub by Esquire Innovations™, etc. None of these products offer Metadata cleaning of Documents attached to emails sent from PDA, BlackBerry™, Palm Treo™ or other handheld devices. Accordingly, a need exists to reduce the chances of unwanted or unauthorized sharing of metadata, particularly in the context of sharing electronic documents with mobile communications devices.

Accordingly, a need exists to provide an improved system of preventing unwanted or unauthorized transmission of electronic documents with metadata.

SUMMARY

The present invention provides for a computer based system and method for removing metadata from a document attached to an email. An email sent from a mobile device is received by a gateway, email server, or other program. The email is analyzed to determine whether it has an attached document. In the event the email includes an attached document the attached document is analyzed to determine the nature of metadata in the document. If the attached document includes metadata the metadata may be cleaned, or the email and or the attachment may be analyzed to determine whether the metadata is to be removed. If the metadata is to be removed a cleaned version of the attached document is created with the metadata, or the desired portion of the metadata, removed. The attached document is replaced with the cleansed version of the attached document, and the email is sent according to the address (or addresses) included in the email (or other delivery instructions specified in either the email or at the gateway, email server or other program). A copy of the cleansed document may be retained. A person, for example a user or administrator, may be notified of the attempt to send a document with metadata, or a person may be given the option of allowing over-ride cleansing the metadata and sending the original attached document with the metadata. A log of all attachments that were cleaned of Metadata may be optionally saved for any desired duration.

DETAILED DESCRIPTION

The present invention is described in the context of a specific embodiment. This is done to facilitate the understanding of the features and principles of the present invention and the present invention is not limited to this embodiment. In particular, the present invention is described in the context of a computer system used to compare, edit, view and/or modify electronic documents.

Figure 1:
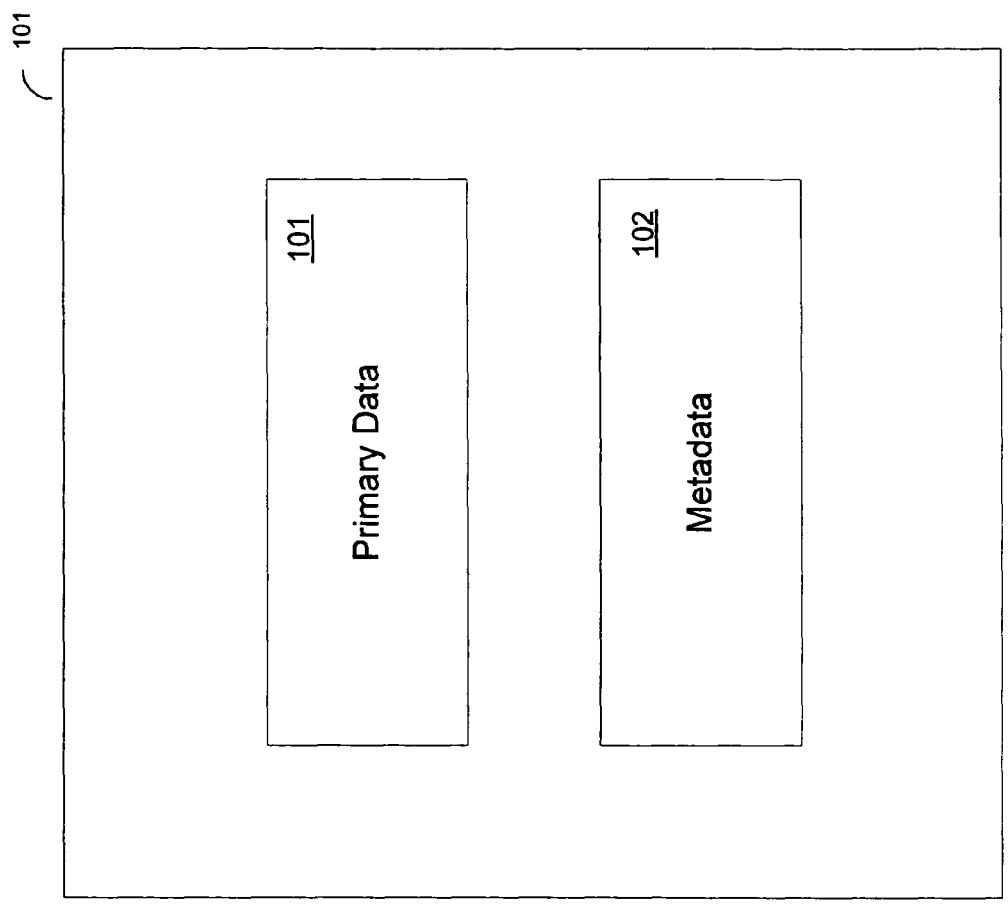
FIG. 1 is a generalized block diagram illustrating a document that may be used with the preferred embodiments.

FIG. 1 is a generalized block diagram illustrating a document 100 that may be used with the preferred embodiments. Document 100 includes primary data 101 and metadata 102. Primary data, in the presently preferred embodiment, includes the information content of the document. By way of example, a document including the play Romeo and Juliet by William Shakespeare would have as the primary data the content information, the prose and words of the play. Additionally, in the presently preferred embodiment, the primary data may include formatting data, such as data on page breaks, paragraph separation and format, text size and type, etc. In the present example metadata 102 may include the author or creator of the document, original name of the document, the time and date the document was created and/or modified, version or history information on the document, including changes made by one or multiple users with user identification, editing time, etc.

Figure 2:
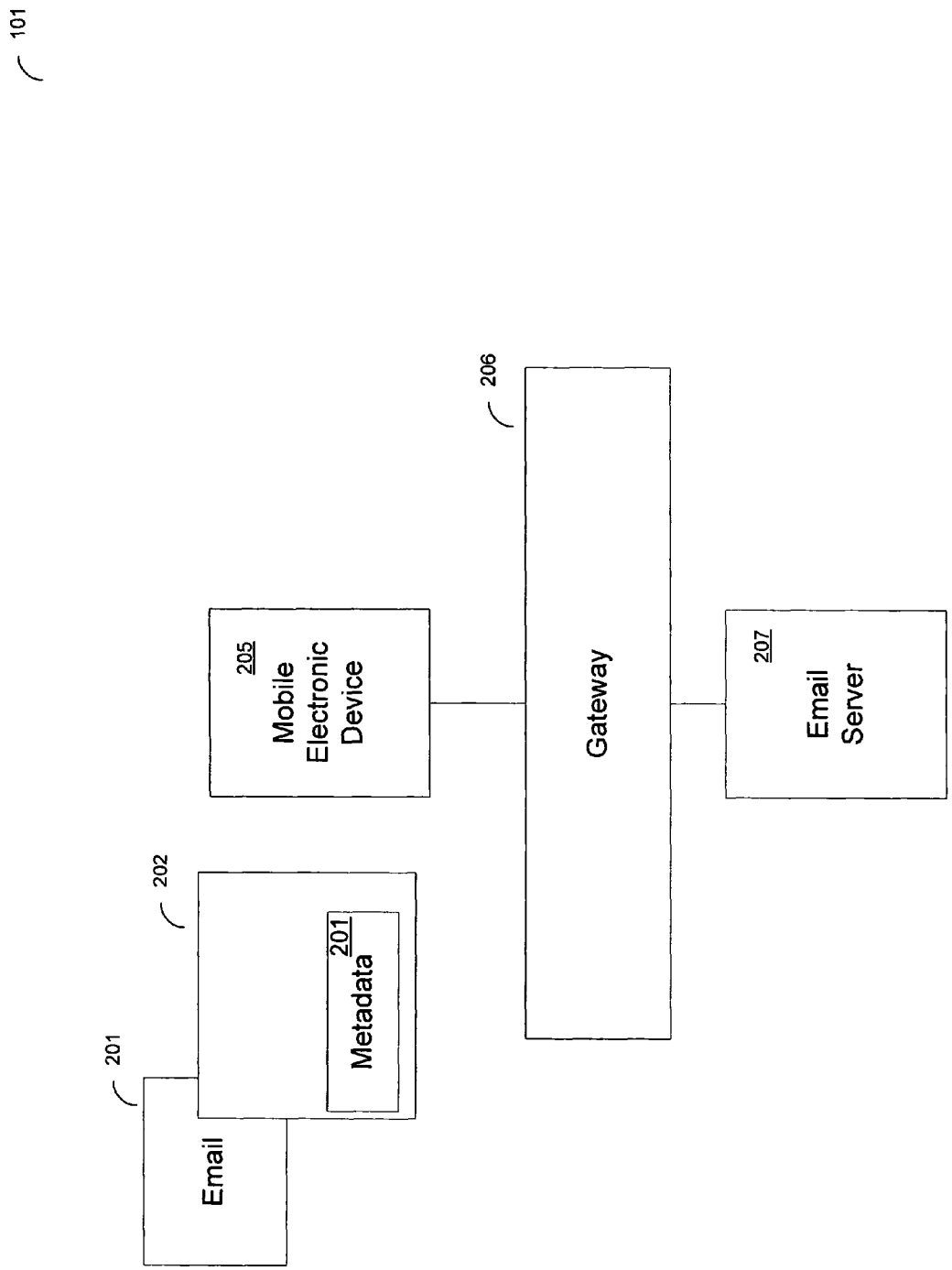
FIG. 2 is a generalized block diagram illustrating the process of removing metadata from an electronic document attached to an email, according to one possible embodiment.

FIG. 2 is a generalized block diagram illustrating the process of removing metadata 201 from an electronic document 202 attached to an email 203. The email 204 is sent from a mobile electronic device 205. In the presently preferred embodiment, electronic device is an end-user device, such as a smart phone or PDA, or other mobile electronic device capable of sending an email with an attachment. The email 203 may be sent to a gateway 206 which implements the metadata removal process described below, or the email may be sent to an email server 207, or to another program in communication with the email server. In the event the email is sent from the electronic device to the email server, the email server may send the email with the attached document to the gateway, or the email server may perform the metadata removal process. In the event the metadata removal is performed by the gateway 206, the email 203 with the attached document with the metadata removed is sent to the email server 207. Alternatively, the email with the attachment with the metadata removed may be sent from the email server if the email server performs the process of removing the metadata from the attachment. In yet another embodiment, the gateway may receive the email with the attachment from the email server, and perform the process of removing the metadata from the attachment at the gateway, and the email with the attached document with the metadata removed may be sent or forwarded by the gateway.

Figure 3:
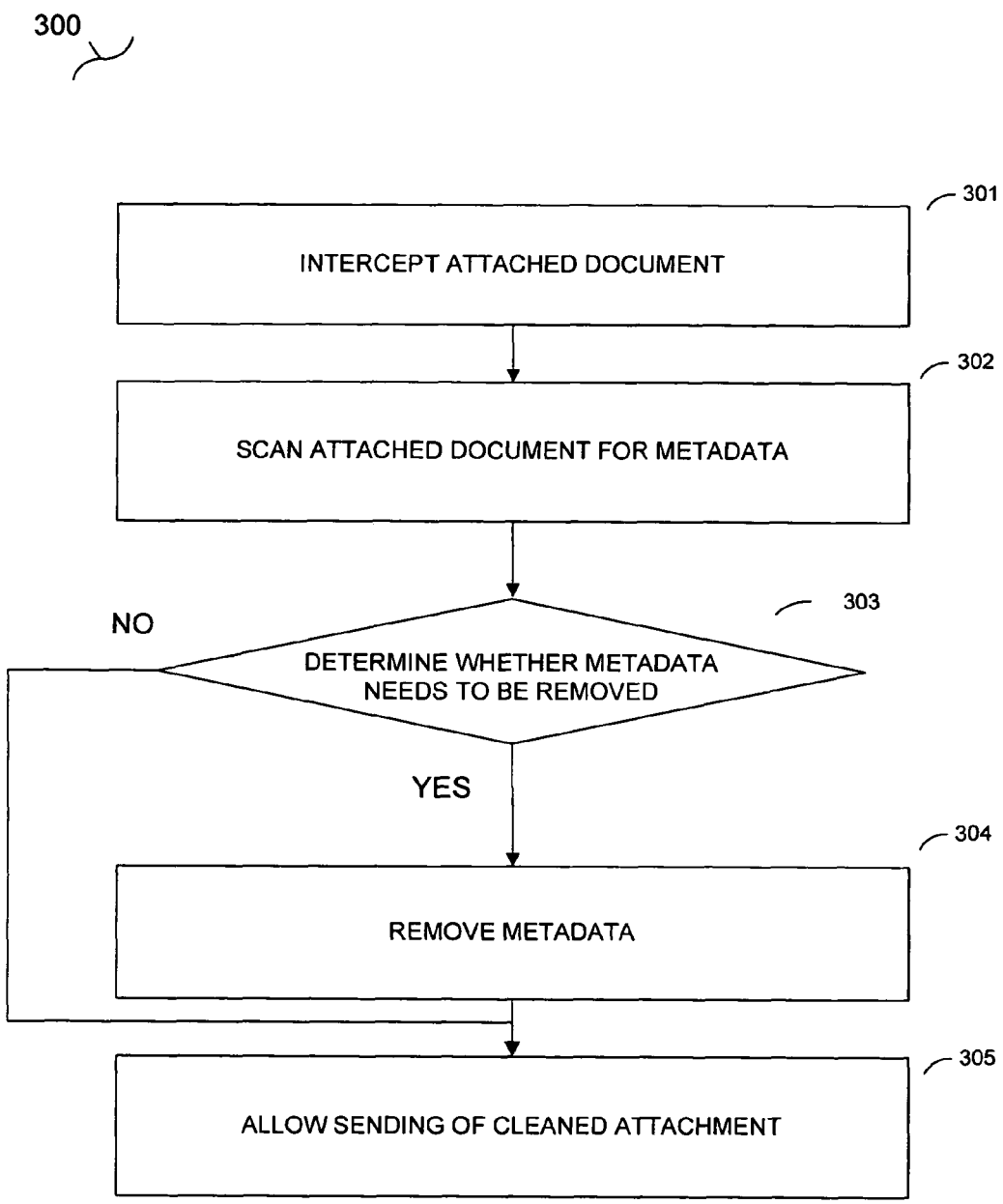
FIG. 3 is a generalized block diagram illustrating the process of removing metadata from an electronic document attached to an email, according to one possible embodiment.

FIG. 3 is a generalized block diagram illustrating the process 300 of removing metadata from an electronic document attached to an email sent from a mobile electronic device. At step 301 the email is received from the mobile electronic device. In the presently preferred embodiment, the email is received prior to the email being received by an email server, such as Microsoft Exchange Server or similar email servers. Alternate embodiments may receive the email from an email server, or the present process may be performed by an email server or computer program in communication with the email server.

At step 302 the received email is analyzed to determine whether it has an attachment. If at step 302 it is determined that the received email has an attachment, then the process proceeds to step 304. If at step 302 it is determined that the received email does not have an attachment, the process proceeds to step 303. At step 303 the email is sent according to the addressing information contained in the email. The email may be sent to an email server for sending, or if the process 300 is being performed by the email server step 303 may be the process of sending email according to the processes and protocols of the email server.

In the presently preferred embodiment, at step 304 the attached electronic document is first analyzed for document type, for example MS® OFFICE (e.g. Word), PDF, text (.txt), etc. Next, the document is examined for metadata. If at step 304 the attached electronic document contains metadata that the user or administrator has selected as "to be removed" (Metadata properties can be preconfigured to remove some of all metadata), then at step 305 the metadata is removed from the attached electronic document. The metadata may be removed from the attached electronic document by invoking a metadata removal application, for example: Metadata Sweeper by Litera®, Metadata Assistant by Payne Consulting™, iScrub by Esquire™ Innovations™ Protect by Workshare™ Out of Sight by Softwise™ etc. At step 306 a cleansed version of the attached electronic document is created from the output of step 305. In the presently preferred embodiment, the cleansed version of the attached electronic document contains all of the primary data of the electronic document, but without the metadata associated with the attached electronic document. In one alternative embodiment, step 305 removes only a portion of the metadata of the original document, the portion removed which may be configurable or in accordance with a metadata removal policy. In the presently preferred embodiment, the cleansed version of the attached electronic document has all of the same attributes, such as the ability to edit and modify the document.

At step 307 the cleansed version of the attached electronic document, or cleansed electronic document, is used to replace the attached electronic document in the received email. At step 308 the received email, with the cleansed electronic document attached, is sent. In one preferred embodiment, the email is sent to an email server, which would then handle the email according to the addressing information and instructions. In alternate embodiments the email server may have already performed the necessary sending operation and the process 300 is an after-sending check to prevent unauthorized or unwanted transmission of metadata. In another alternative embodiment, the process 300 may be performed by the email server, and step 308 may include the process of sending the email performed by the email server.

At step 309 cleansed version of the attached electronic document may be saved, either on a server, in attached or networked storage, or on the end-user's electronic device.

Alternate embodiments of the present invention may alert the end user that the attached electronic document has been cleansed prior to transmitting a cleansed version. Additionally, alerts may be sent to an admin, or a log of an attempted sending of an un-cleansed document may be stored and/or reported.

While process 300 describes the intercept of all emails with attachments, alternate embodiments could determine whether to intercept an email according to one or more policies or algorithms. For example, policies may be used to determine whether to cleanse an email according to sender, recipient, type of attachment, aspects of primary data, aspects of metadata, etc.

Figure 4:
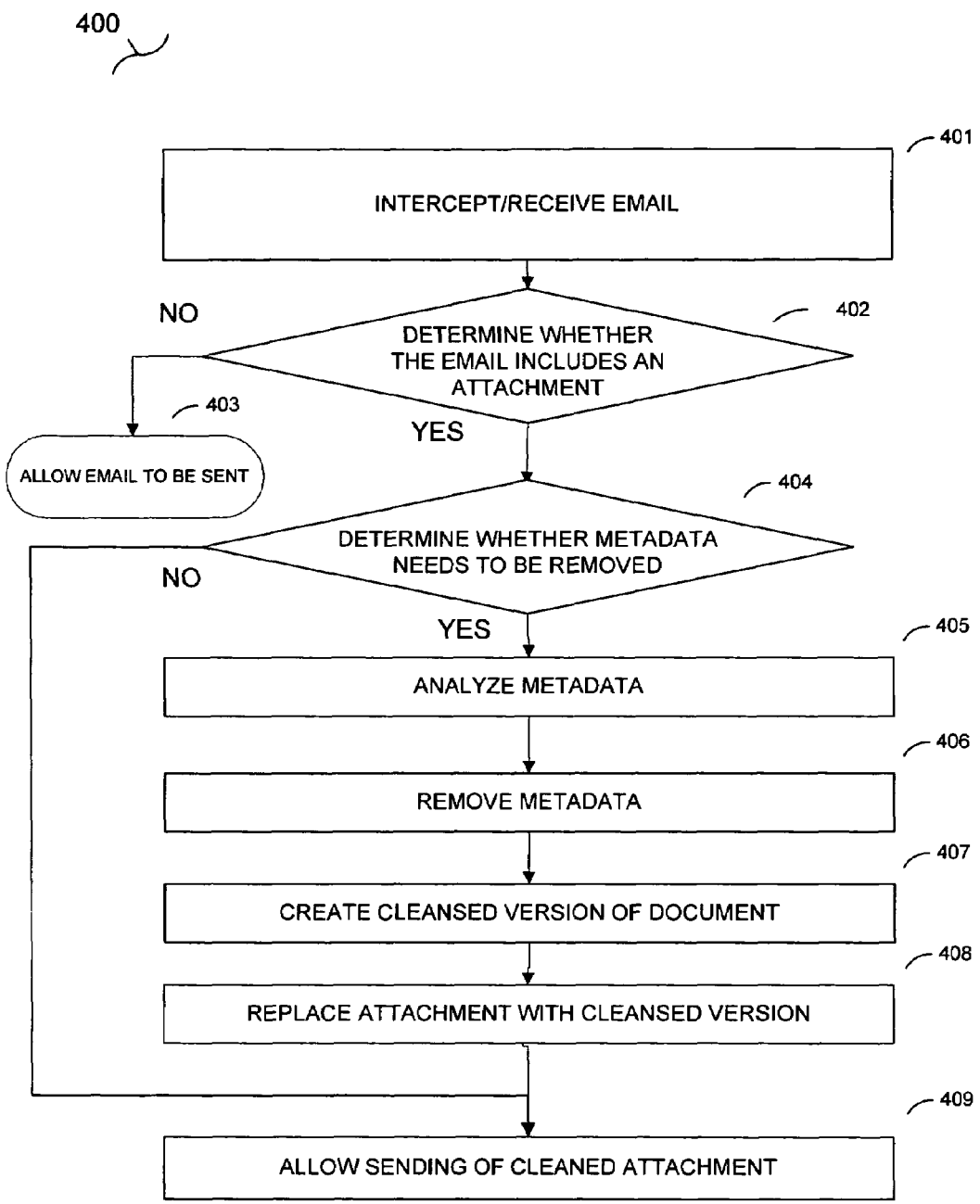
FIG. 4 is a generalized block diagram of a process of removing metadata from email attachments, according to one possible embodiment.

FIG. 4 is a generalized block diagram of a process 400 of removing metadata from email attachments. At step 401 the email is received from a mobile electronic device. In the presently preferred embodiment, the email is received prior to the email being received by an email server, such as Microsoft Exchange Server or similar email servers. Alternate embodiments may receive the email from an email server, or the present process may be performed by an email server.

At step 402 the received email is analyzed to determine whether it has an attachment. If at step 402 it is determined that the received email has an attachment, then the process proceeds to step 404. If at step 402 it is determined that the received email does not have an attachment, the process proceeds to step 403. At step 403 the email is sent according to the addressing information contained in the email. The email may be sent to an email server, or if the process 400 is being performed by the email server step 403 may include sending email according to the processes and protocols of the email server.

At step 404 the attached document is analyzed to determine whether to remove metadata from the attached document. A cleansing policy is compared to the information obtained from analyzing the attached document to determine whether the attached document is to be cleansed prior to sending the document. The cleaning policy may specify certain types of metadata such as document properties, specific aspects of metadata, for example specific authors, titles, etc., or any other type of metadata that may be included in a document.

If at step 404 the determination is made that the attached document is not to be cleansed, i.e., the attached document will not have metadata removed, then the process proceeds to step 409 where the email with the attached document is sent.

If at step 404 the determination is made to cleanse the attached document, then the process proceeds to step 405 where the attached electronic document is analyzed for metadata. If at step 405 the attached electronic document contains metadata, then at step 406 the pre specified (ether as a default preference, a configured preference, etc.) metadata is removed from the attached electronic document. The metadata may be removed from the attached electronic document by invoking a metadata removal application, such as the examples listed above or other such programs. At step 407 a cleansed version of the attached electronic document is created from the output of step 406. In the presently preferred embodiment, the cleansed version of the attached electronic document contains all of the primary data of the electronic document, but without the metadata associated with the attached electronic document. In the presently preferred embodiment, the cleansed version of the attached electronic document has all of the same attributes, such as the ability to edit and modify the document.

At step 408 the cleansed version of the attached electronic document, or cleansed electronic document, is used to replace the attached electronic document in the received email. At step 409 the received email, with the cleansed electronic document attached, is sent. In one preferred embodiment, the email is sent to an email server, which would then handle the email according to the addressing information and instructions. In alternate embodiments the email server may have already performed the necessary sending operation and the process 400 is an after-sending check to prevent unauthorized or unwanted transmission of metadata. In another alternative embodiment, the process 400 may be performed by the email server, and step 409 may include the process of sending the email performed by the email server.

At step 410 cleansed version of the attached electronic document may be saved, either on a server, in attached or networked storage, or on the end-user's electronic device.

Alternate embodiments of the present invention may alert the end user that the attached electronic document has been cleansed prior to transmitting a cleansed version. Additionally, alerts may be sent to an admin, or a log of an attempted sending of an un-cleansed document may be stored and/or reported. Still other embodiments may include seeking confirmation from a person (the sender, an administrator, or another) before cleaning and replacing the attached document, or before sending a cleansed version of the attached document.

While process 300 and 400 were described in the context of a single attachment of an email, multiple attachments, either of the same document type or of multiple document types, may be analyzed and cleansed prior to sending an email.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

I claim:

1. A method of transmitting an electronic document, comprising:
   receiving an email message having a delivery address at an intermediate computer system;
   determining whether the email message has an attached document;
   in the event the email message has the attached document:
      automatically creating a cleansed version of the attached document at the intermediate computer system that received the email message by removing at least a portion of the metadata from the attached document;
      replacing in the email message the attached document with the cleansed version of the attached document; and
      sending the email message with the cleansed version of the attached document from the intermediate computer system to the delivery address.

2. The method of claim 1, wherein the removing is performed by invoking a metadata removal application.

3. The method of claim 1, further comprising saving the cleansed version of the attached document.

4. The method of claim 1, further comprising:
   notifying an end user associated with the email message received at the intermediate computer that the attached document included metadata.

5. The method of claim 1, wherein the intermediate computer system receiving the email message having an attached document is an email server.

6. The method of claim 1, wherein the email message is received from a mobile computing device, a Blackberry™, a Palm TREO™, or other Smartphone.

7. The method of claim 1, wherein the email message is received from webmail.

8. The method of claim 1, wherein automatically creating a cleansed version of the attached document further includes removing only pre-specified types of metadata in accordance with a cleansing policy.

9. The method of claim 1, further comprising:
   saving an entry in a log to indicate the email message had the attached document replaced by the cleansed version of the attached document.

10. A method of transmitting an electronic document, comprising:
    receiving an email message having a delivery address at an intermediate computer system from a mobile electronic device;
    determining whether the email message has an attached document;
    in the event the email message has an attached document:
       determining, at the intermediate computer system, whether the attached document is to be cleansed of metadata according to a cleansing policy;
    in the event the attached document is to be cleansed:
       automatically removing metadata from the attached document;
       creating a cleansed version of the attached document at the intermediate computer system that received the email message;
       replacing in the email message the attached document with the cleansed version of the attached document; and
       sending the email message with the cleansed version of the attached document from the intermediate computer system to the delivery address.

11. The method of claim 10, further comprising saving the cleansed version of the attached document.

12. The method of claim 10, wherein the cleansing policy specifies the attached document is to be cleansed if it is a RTF document or a PDF document or an MS® OFFICE document, including a WORD document, an EXCEL® document, a PowerPoint® document, a Visio® document, or a FrontPage® document.

13. The method of claim 10, wherein the cleansing policy specifies the attached-document is to be cleansed if the attached document comes from a specific user.

14. The method of claim 10, wherein the cleansing policy specifies the attached document is to be cleansed if the attached document is a company document or a specific department document.

15. The method of claim 10, wherein the cleansing policy specifies the attached document is to be cleansed if the attached document contains a pre-specified type of metadata.

16. The method of claim 10, wherein the cleansing policy allows users to choose not to cleanse pre-specified types of metadata.

17. A method of preventing unauthorized transmission of metadata in electronic documents, comprising:
receiving at an intermediate computer system an email having a delivery address and an attached electronic document sent from a mobile electronic device, the attached electronic document including primary data and metadata;
automatically removing the metadata from the attached electronic document at the intermediate computer system that received the email;
transmitting the received email, including the attached electronic document that has had the metadata removed, from the intermediate computer system that received the email.

18. The method of claim 17, wherein only pre-determined types of metadata are removed.

19. The method of claim 17, further comprising,
requesting permission to remove the metadata prior to said removing;
in the event the permission is denied,
transmitting the received email with the attached electronic document that includes the metadata.

20. The method of claim 17, wherein the email is received from a Blackberry™, a Palm TREO™, other Smartphone, a mobile computing device, or Web-mail.

21. The method of claim 20, wherein the intermediate computer system that receives the email forwards it to an email server.

* * * * *

UNITED STATES PATENT AND TRADEMARK OFFICE
CERTIFICATE OF CORRECTION

| | | |
|---|---|---|
| PATENT NO. | : 7,895,276 B2 | Page 1 of 1 |
| APPLICATION NO. | : 11/699750 | |
| DATED | : February 22, 2011 | |
| INVENTOR(S) | : Deepak Massand | |

It is certified that error appears in the above-identified patent and that said Letters Patent is hereby corrected as shown below:

In claim 1, col. 5, line 64, "portion of the metadata" should read --portion of metadata--.

Signed and Sealed this
Twenty-sixth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,895,276 B2 | Page 1 of 1 |
| APPLICATION NO. | : 11/699750 | |
| DATED | : February 22, 2011 | |
| INVENTOR(S) | : Massand et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 196 days.

Signed and Sealed this
Fourteenth Day of June, 2011

David J. Kappos
*Director of the United States Patent and Trademark Office*